US008116423B2

(12) United States Patent
Bashkirtsev et al.

(10) Patent No.: US 8,116,423 B2
(45) Date of Patent: Feb. 14, 2012

(54) NUCLEAR REACTOR (ALTERNATIVES), FUEL ASSEMBLY OF SEED-BLANKET SUBASSEMBLIES FOR NUCLEAR REACTOR (ALTERNATIVES), AND FUEL ELEMENT FOR FUEL ASSEMBLY

(75) Inventors: Sergey Mikhailovich Bashkirtsev, Moscow (RU); Valentin Fedorovich Kuznetsov, Moscow (RU); Valery Vladimirovich Kevrolev, Moscow (RU); Alexey Glebovich Morozov, Moscow (RU)

(73) Assignee: Thorium Power, Inc., McLean, VA (US)

( * ) Notice: Subject to any disclaimer, the term of this patent is extended or adjusted under 35 U.S.C. 154(b) by 406 days.

(21) Appl. No.: 12/340,833

(22) Filed: Dec. 22, 2008

(65) Prior Publication Data
US 2009/0252278 A1    Oct. 8, 2009

Related U.S. Application Data

(60) Provisional application No. 61/116,730, filed on Nov. 21, 2008.

(51) Int. Cl.
*G21C 3/00* (2006.01)

(52) U.S. Cl. ......... 376/412; 376/171; 376/172; 376/173

(58) Field of Classification Search ................. 376/412, 376/171–173, 409, 434
See application file for complete search history.

(56) References Cited

U.S. PATENT DOCUMENTS
2,780,517 A    2/1957  Fontana
(Continued)

FOREIGN PATENT DOCUMENTS
DE    1464481    1/1969
(Continued)

OTHER PUBLICATIONS

International Search Report from Russian Patent Office in corresponding Patent Application PCT/RU2007/000732 mailed Jul. 10, 2008.

(Continued)

*Primary Examiner* — Ricardo Palabrica
(74) *Attorney, Agent, or Firm* — Pillsbury Winthrop Shaw LLP

(57) ABSTRACT

The invention relates to light water reactor designs in which thorium is used as fuel and in particular to designs of jacketless fuel assemblies, which make up the cores of pressurized water reactors (PWRs) such as the VVER-1000. Nuclear reactor cores containing seed and blanket subassemblies that make up the fuel assemblies are used to burn thorium fuel together with conventional reactor fuel that includes nonproliferative enriched uranium, as well as weapons-grade and reactor-grade plutonium. In the first alternative, the reactor core is fully "nonproliferative," since neither the reactor fuel nor the wastes generated can be used to produce nuclear weapons. In the second version of the invention, the reactor core is used to burn large amounts of weapons-grade plutonium together with thorium and provides a suitable means to destroy stockpiles of weapons-grade plutonium and convert the energy released to electric power. The cores in both embodiments of the invention are made up of a set of seed-blanket assemblies, which have central seed areas surrounded by annular blanket areas. The seed areas contain uranium or plutonium fuel rods, while the blanket areas contain thorium fuel rods. The volume ratio of moderator to fuel and the relative sizes of the seed area and the blanket area have been optimized so that neither embodiment of the invention generates wastes that can be used to produced nuclear weapons. A new refueling system is also used for the first embodiment of the invention to maximize recycling of the seed fuel; the system also ensures that the spent nuclear fuel cannot be used to produce nuclear weapons.

10 Claims, 8 Drawing Sheets

U.S. PATENT DOCUMENTS

| | | |
|---|---|---|
| 2,879,216 A | 3/1959 | Hurwitz, Jr. et al. |
| 2,887,357 A | 5/1959 | Seaborg et al. |
| 2,894,827 A | 7/1959 | Hyde et al. |
| 2,898,185 A | 8/1959 | Boyd et al. |
| 3,030,291 A | 4/1962 | Butler et al. |
| 3,034,975 A | 5/1962 | Beurtheret |
| 3,046,088 A | 7/1962 | Horn |
| 3,063,925 A | 11/1962 | Huet |
| 3,088,900 A | 5/1963 | Brown et al. |
| 3,096,264 A | 7/1963 | Bauer |
| 3,105,035 A | 9/1963 | Weems |
| 3,133,867 A | 5/1964 | Frisch |
| 3,154,471 A | 10/1964 | Radkowsky |
| 3,177,123 A | 4/1965 | Huet |
| 3,208,912 A | 9/1965 | Jaye et al. |
| 3,219,535 A * | 11/1965 | Robbins ................ 376/173 |
| 3,282,335 A | 11/1966 | De Haller |
| 3,285,825 A | 11/1966 | Jens |
| 3,308,033 A | 3/1967 | Alfille et al. |
| 3,309,277 A | 3/1967 | Jaye et al. |
| 3,322,644 A | 5/1967 | Benson |
| 3,335,060 A | 8/1967 | Diener |
| 3,339,631 A | 9/1967 | McGurty et al. |
| 3,361,640 A | 1/1968 | Hassig et al. |
| 3,366,547 A | 1/1968 | Gumuchian et al. |
| 3,378,453 A | 4/1968 | Gorker |
| 3,394,049 A | 7/1968 | Jones |
| 3,486,973 A | 12/1969 | Georges et al. |
| 3,546,068 A | 12/1970 | Schluderberg |
| 3,567,582 A | 3/1971 | Van Dievoet et al. |
| 3,577,225 A | 5/1971 | Shaffer et al. |
| 3,640,844 A | 2/1972 | Shank et al. |
| 3,660,227 A | 5/1972 | Ackroyd et al. |
| 3,660,228 A | 5/1972 | Magladry |
| 3,671,392 A | 6/1972 | Beaudoin et al. |
| 3,714,322 A | 1/1973 | Bell et al. |
| 3,736,227 A | 5/1973 | Nakazato |
| 3,801,734 A | 4/1974 | West |
| 3,814,667 A | 6/1974 | Klumb et al. |
| 3,847,736 A | 11/1974 | Bevilacqua |
| 3,853,703 A | 12/1974 | Anthony et al. |
| 3,859,165 A | 1/1975 | Radkowsky et al. |
| 3,956,147 A | 5/1976 | Becker et al. |
| 3,957,575 A | 5/1976 | Fauth |
| T947,011 I4 | 6/1976 | Radkowsky |
| 3,960,655 A * | 6/1976 | Bohanan et al. ............ 376/173 |
| 3,971,575 A | 7/1976 | Lesham et al. |
| 3,998,692 A | 12/1976 | Bohanan et al. |
| 4,029,740 A | 6/1977 | Ervin, Jr. |
| 4,072,564 A | 2/1978 | Jabsen |
| 4,077,835 A | 3/1978 | Bishop et al. |
| 4,078,967 A | 3/1978 | Anthony |
| 4,111,348 A | 9/1978 | Laird et al. |
| 4,119,563 A | 10/1978 | Kadner et al. |
| 4,192,716 A | 3/1980 | Anthony |
| 4,193,953 A | 3/1980 | Langen et al. |
| 4,194,948 A | 3/1980 | Ledin |
| 4,202,793 A | 5/1980 | Bezzi et al. |
| 4,235,669 A | 11/1980 | Burgess et al. |
| 4,268,357 A | 5/1981 | Formanek |
| 4,273,613 A | 6/1981 | Radkowsky |
| 4,278,501 A | 7/1981 | Steinke |
| 4,285,771 A | 8/1981 | Downs |
| 4,292,278 A | 9/1981 | Elikan et al. |
| 4,298,434 A | 11/1981 | Anthony et al. |
| 4,304,631 A | 12/1981 | Walton et al. |
| 4,309,251 A | 1/1982 | Anthony et al. |
| 4,320,093 A | 3/1982 | Volesky et al. |
| 4,324,618 A | 4/1982 | Schluderberg |
| 4,344,912 A | 8/1982 | Rampolla |
| 4,381,284 A | 4/1983 | Gjertsen |
| 4,393,510 A | 7/1983 | Lang et al. |
| RE31,583 E | 5/1984 | Klumb et al. |
| 4,450,016 A | 5/1984 | Vesterlund et al. |
| 4,450,020 A | 5/1984 | Vesterlund |
| 4,474,398 A | 10/1984 | Tolino et al. |
| 4,495,136 A | 1/1985 | Camden, Jr. et al. |
| 4,499,047 A | 2/1985 | Borrman et al. |
| 4,508,679 A | 4/1985 | Matzner et al. |
| 4,540,545 A | 9/1985 | Kondo |
| 4,544,522 A | 10/1985 | Curulla et al. |
| 4,551,300 A | 11/1985 | Feutrel |
| 4,560,532 A | 12/1985 | Barry et al. |
| 4,572,816 A | 2/1986 | Gjertsen |
| 4,578,240 A | 3/1986 | Cadwell |
| 4,579,711 A | 4/1986 | Mishima et al. |
| 4,584,167 A | 4/1986 | Carelli |
| 4,587,078 A | 5/1986 | Azekura et al. |
| 4,589,929 A | 5/1986 | Steinberg |
| 4,615,862 A | 10/1986 | Huckestein |
| 4,645,642 A | 2/1987 | Leclercq et al. |
| 4,652,425 A | 3/1987 | Ferrari et al. |
| 4,659,538 A | 4/1987 | Leclercq |
| 4,664,880 A | 5/1987 | Bryan |
| 4,666,664 A | 5/1987 | Doshi |
| 4,670,213 A | 6/1987 | Wilson et al. |
| 4,671,924 A | 6/1987 | Gjertsen et al. |
| 4,671,927 A | 6/1987 | Alsop |
| 4,678,619 A | 7/1987 | Radkowsky |
| 4,678,627 A | 7/1987 | Rylatt |
| 4,678,632 A | 7/1987 | Ferrari |
| 4,680,443 A | 7/1987 | Vere et al. |
| 4,684,495 A | 8/1987 | Wilson et al. |
| 4,684,503 A | 8/1987 | Shallenberger |
| 4,692,304 A | 9/1987 | Gjertsen |
| 4,699,758 A | 10/1987 | Shallenberger et al. |
| 4,699,761 A | 10/1987 | Gjertsen et al. |
| 4,702,883 A | 10/1987 | Wilson et al. |
| 4,716,015 A | 12/1987 | Carlson |
| 4,746,488 A | 5/1988 | Pradal et al. |
| 4,749,519 A | 6/1988 | Koehly et al. |
| 4,762,676 A | 8/1988 | Gjertsen et al. |
| 4,765,909 A | 8/1988 | Rourke et al. |
| 4,818,474 A | 4/1989 | Malhouitre et al. |
| 4,820,473 A | 4/1989 | Ohashi et al. |
| 4,828,792 A | 5/1989 | Leclercq et al. |
| 4,832,905 A | 5/1989 | Bryan et al. |
| 4,842,814 A | 6/1989 | Takase et al. |
| 4,859,400 A | 8/1989 | Curzon |
| 4,879,086 A | 11/1989 | Luce et al. |
| 4,880,607 A | 11/1989 | Horton et al. |
| 4,900,507 A | 2/1990 | Shallenberger et al. |
| 4,918,710 A | 4/1990 | Bard |
| 4,938,921 A | 7/1990 | Mardon et al. |
| 4,942,016 A | 7/1990 | Marlowe et al. |
| 4,954,293 A | 9/1990 | Cailly et al. |
| 4,957,695 A | 9/1990 | Rudolph |
| 4,968,476 A | 11/1990 | Radkowsky |
| 4,986,957 A | 1/1991 | Taylor |
| 4,986,960 A | 1/1991 | Larson |
| 4,997,596 A | 3/1991 | Proebstle et al. |
| 5,002,726 A | 3/1991 | Johansson |
| 5,009,837 A | 4/1991 | Nguyen et al. |
| 5,019,327 A | 5/1991 | Fanning et al. |
| 5,019,333 A | 5/1991 | Isobe et al. |
| 5,024,426 A | 6/1991 | Busch et al. |
| 5,024,807 A | 6/1991 | Hatfield et al. |
| 5,024,809 A | 6/1991 | Taylor |
| 5,024,810 A | 6/1991 | Bachman |
| 5,026,516 A | 6/1991 | Taylor |
| 5,030,412 A | 7/1991 | Yates et al. |
| 5,032,351 A | 7/1991 | Johansson |
| 5,035,869 A | 7/1991 | Furuya |
| 5,037,605 A | 8/1991 | Riordan, III |
| 5,053,191 A | 10/1991 | Bryan et al. |
| 5,069,864 A | 12/1991 | Johansson |
| 5,073,336 A | 12/1991 | Taylor |
| 5,085,827 A | 2/1992 | Johansson et al. |
| 5,089,210 A | 2/1992 | Reese et al. |
| 5,089,220 A | 2/1992 | Nylund |
| 5,089,221 A | 2/1992 | Johansson et al. |
| 5,091,145 A | 2/1992 | Petit |
| 5,093,075 A | 3/1992 | Cheverau et al. |
| 5,094,802 A | 3/1992 | Riordan, III |
| 5,110,539 A | 5/1992 | Perrotti et al. |
| 5,112,571 A | 5/1992 | Orii et al. |
| 5,135,710 A | 8/1992 | Grattier et al. |

| Patent | Type | Date | Inventor |
|---|---|---|---|
| 5,135,728 | A | 8/1992 | Karraker |
| 5,136,619 | A | 8/1992 | Capossela et al. |
| 5,141,701 | A | 8/1992 | Bryan |
| 5,147,597 | A | 9/1992 | Roofthooft et al. |
| 5,147,600 | A | 9/1992 | Kadono et al. |
| 5,149,491 | A | 9/1992 | Congdon et al. |
| 5,164,050 | A | 11/1992 | Bertaud et al. |
| 5,183,629 | A | 2/1993 | Canat et al. |
| 5,186,891 | A | 2/1993 | Johansson et al. |
| 5,188,797 | A | 2/1993 | Bryan |
| 5,192,495 | A | 3/1993 | Caldwell et al. |
| 5,194,216 | A | 3/1993 | McDaniels, Jr. |
| 5,200,142 | A | 4/1993 | DeMario et al. |
| 5,202,085 | A | 4/1993 | Aoyama et al. |
| 5,209,899 | A | 5/1993 | Johansson et al. |
| 5,211,908 | A | 5/1993 | Verdier |
| 5,219,519 | A | 6/1993 | Matzner |
| 5,221,515 | A | 6/1993 | Thiebaut et al. |
| 5,223,211 | A | 6/1993 | Inagaki et al. |
| 5,241,570 | A | 8/1993 | Challberg |
| 5,243,635 | A | 9/1993 | Bryan |
| 5,247,550 | A | 9/1993 | Perkins et al. |
| 5,259,009 | A | 11/1993 | Patterson et al. |
| 5,259,010 | A | 11/1993 | Brown et al. |
| 5,263,071 | A | 11/1993 | Farkas et al. |
| 5,265,139 | A | 11/1993 | Yanagi et al. |
| 5,267,291 | A | 11/1993 | Matzner et al. |
| 5,271,053 | A | 12/1993 | Bryan |
| 5,272,741 | A | 12/1993 | Masuhara et al. |
| 5,272,742 | A | 12/1993 | Attix et al. |
| 5,274,685 | A | 12/1993 | Yates |
| 5,276,721 | A | 1/1994 | Beuerlein |
| 5,278,882 | A | 1/1994 | Garde et al. |
| 5,278,883 | A | 1/1994 | Patterson et al. |
| 5,282,231 | A | 1/1994 | Adams et al. |
| 5,283,812 | A | 2/1994 | Verdier |
| 5,283,821 | A | 2/1994 | Karoutas |
| 5,286,946 | A | 2/1994 | Will |
| 5,289,514 | A | 2/1994 | Lippert et al. |
| 5,297,176 | A | 3/1994 | Altman et al. |
| 5,297,177 | A | 3/1994 | Inagaki et al. |
| 5,299,246 | A | 3/1994 | Bryan |
| 5,301,218 | A | 4/1994 | Taylor, Jr. et al. |
| 5,307,393 | A | 4/1994 | Hatfield |
| 5,328,524 | A | 7/1994 | Hertz |
| 5,340,447 | A | 8/1994 | Bertaud et al. |
| 5,341,407 | A | 8/1994 | Rosenbaum et al. |
| 5,345,483 | A | 9/1994 | Johansson et al. |
| 5,347,560 | A | 9/1994 | Lippert et al. |
| 5,349,618 | A | 9/1994 | Greenspan |
| 5,373,541 | A | 12/1994 | Mardon et al. |
| 5,375,154 | A | 12/1994 | Matzner et al. |
| 5,383,228 | A | 1/1995 | Armijo et al. |
| 5,384,814 | A | 1/1995 | Matzner et al. |
| 5,386,439 | A | 1/1995 | Leroy et al. |
| 5,386,440 | A | 1/1995 | Kashiwai et al. |
| 5,390,220 | A | 2/1995 | Zuloaga, Jr. et al. |
| 5,390,221 | A | 2/1995 | Dix et al. |
| 5,390,222 | A | 2/1995 | Rau et al. |
| 5,403,565 | A | 4/1995 | Delloye et al. |
| 5,404,383 | A | 4/1995 | Nylund |
| 5,417,780 | A | 5/1995 | Adamson et al. |
| 5,420,901 | A | 5/1995 | Johansson |
| 5,420,902 | A | 5/1995 | Dressel et al. |
| 5,434,897 | A | 7/1995 | Davies |
| 5,434,898 | A | 7/1995 | Barkhurst |
| 5,436,946 | A | 7/1995 | Curulla et al. |
| 5,436,947 | A | 7/1995 | Taylor |
| 5,437,747 | A | 8/1995 | Adamson et al. |
| 5,438,598 | A | 8/1995 | Attix |
| 5,440,599 | A | 8/1995 | Rodack et al. |
| 5,444,748 | A | 8/1995 | Beuchel et al. |
| 5,452,334 | A | 9/1995 | Reparaz et al. |
| 5,469,481 | A | 11/1995 | Adamson et al. |
| 5,473,650 | A | 12/1995 | Johansson |
| 5,481,577 | A | 1/1996 | Yates et al. |
| 5,481,578 | A | 1/1996 | Matzner |
| 5,483,564 | A | 1/1996 | Matzner et al. |
| 5,488,634 | A | 1/1996 | Johansson et al. |
| 5,488,644 | A | 1/1996 | Johansson |
| 5,490,189 | A | 2/1996 | Schechter |
| 5,490,190 | A | 2/1996 | Hopkins et al. |
| 5,517,540 | A | 5/1996 | Marlowe et al. |
| 5,517,541 | A | 5/1996 | Rosenbaum et al. |
| 5,519,745 | A | 5/1996 | Proebstle et al. |
| 5,519,746 | A | 5/1996 | Dalke et al. |
| 5,519,748 | A | 5/1996 | Adamson et al. |
| 5,524,032 | A | 6/1996 | Adamson et al. |
| 5,526,387 | A | 6/1996 | Johansson et al. |
| 5,528,640 | A | 6/1996 | Johansson et al. |
| 5,530,729 | A | 6/1996 | Gustafsson |
| 5,538,701 | A | 7/1996 | Avens et al. |
| 5,539,791 | A | 7/1996 | Garzarolli et al. |
| 5,539,792 | A | 7/1996 | Buttner et al. |
| 5,539,793 | A | 7/1996 | Johansson et al. |
| 5,546,437 | A | 8/1996 | Matzner et al. |
| 5,572,560 | A | 11/1996 | Brown |
| 5,577,081 | A | 11/1996 | Yaginuma |
| 5,578,145 | A | 11/1996 | Adamson et al. |
| 5,596,615 | A | 1/1997 | Nakamura et al. |
| 5,600,694 | A | 2/1997 | Broders |
| 5,606,724 | A | 2/1997 | Wai et al. |
| 5,609,697 | A | 3/1997 | Moinard et al. |
| 5,618,356 | A | 4/1997 | Adamson et al. |
| 5,620,536 | A | 4/1997 | Dahlback |
| 5,622,574 | A | 4/1997 | Charquet |
| 5,648,995 | A | 7/1997 | Mardon et al. |
| 5,666,389 | A | 9/1997 | Andersson et al. |
| 5,674,330 | A | 10/1997 | Charquet et al. |
| 5,675,621 | A | 10/1997 | Croteau et al. |
| 5,681,404 | A | 10/1997 | Adamson et al. |
| 5,699,396 | A | 12/1997 | Taylor |
| 5,702,544 | A | 12/1997 | Mardon et al. |
| 5,711,826 | A | 1/1998 | Nordstrom |
| 5,726,418 | A | 3/1998 | Duthoo |
| 5,727,039 | A | 3/1998 | Harmon et al. |
| 5,732,116 | A | 3/1998 | Petit |
| 5,737,375 | A | 4/1998 | Radkowsky |
| 5,740,218 | A | 4/1998 | Frederickson et al. |
| 5,748,694 | A | 5/1998 | King |
| 5,768,332 | A | 6/1998 | Van Swam |
| 5,774,514 | A | 6/1998 | Rubbia |
| 5,774,517 | A | 6/1998 | Palavecino et al. |
| 5,778,035 | A | 7/1998 | Nylund |
| 5,787,142 | A | 7/1998 | Van Swam |
| 5,808,271 | A | 9/1998 | Duthoo |
| 5,826,163 | A | 10/1998 | Saraceno et al. |
| 5,832,050 | A | 11/1998 | Rebeyrolle et al. |
| 5,838,753 | A | 11/1998 | Van Swam et al. |
| 5,844,957 | A | 12/1998 | Johannesson et al. |
| 5,852,645 | A | 12/1998 | Romary et al. |
| 5,854,818 | A | 12/1998 | Van Swam et al. |
| 5,859,887 | A | 1/1999 | Richards |
| 5,864,593 | A | 1/1999 | Radkowsky |
| 5,892,807 | A | 4/1999 | Van Swam |
| 5,901,193 | A | 5/1999 | Dahlback et al. |
| 5,926,517 | A | 7/1999 | Van Swam |
| 5,940,464 | A | 8/1999 | Mardon et al. |
| 5,949,837 | A | 9/1999 | Radkowsky |
| 5,949,839 | A | 9/1999 | Nylund |
| 6,002,735 | A | 12/1999 | Van Swam |
| 6,010,671 | A | 1/2000 | Kimura |
| 6,026,136 | A | 2/2000 | Radkowsky |
| 6,033,493 | A | 3/2000 | Hertz et al. |
| 6,110,437 | A | 8/2000 | Schall et al. |
| 6,130,927 | A | 10/2000 | Kang et al. |
| 6,167,105 | A | 12/2000 | Yoon et al. |
| 6,192,098 | B1 | 2/2001 | Van Swam |
| 6,205,196 | B1 | 3/2001 | Yamashita et al. |
| 6,226,342 | B1 | 5/2001 | Micko et al. |
| 6,228,337 | B1 | 5/2001 | Ioffe |
| 6,229,868 | B1 | 5/2001 | Nylund et al. |
| 6,236,702 | B1 | 5/2001 | Chun et al. |
| 6,243,433 | B1 | 6/2001 | Adamson et al. |
| 6,278,757 | B1 | 8/2001 | Yokomizo et al. |
| 6,278,759 | B1 | 8/2001 | Yoon et al. |
| 6,310,931 | B1 | 10/2001 | Gustafsson et al. |
| 6,320,924 | B1 | 11/2001 | Croteau |

| | | | | | | |
|---|---|---|---|---|---|---|
| 6,327,324 B2 | 12/2001 | Nylund | | 2006/0045231 A1 | 3/2006 | Lee et al. |
| 6,339,205 B1 | 1/2002 | Nakayama | | 2006/0153327 A1 | 7/2006 | Jiang |
| 6,385,271 B2 | 5/2002 | Nylund | | 2006/0171498 A1 | 8/2006 | D'Auvergne |
| 6,393,087 B1 | 5/2002 | Oh et al. | | 2006/0233685 A1 | 10/2006 | Janes |
| 6,400,788 B1 | 6/2002 | Hirano et al. | | 2006/0251205 A1 | 11/2006 | Balog |
| 6,421,407 B1 | 7/2002 | Kang et al. | | 2006/0283790 A1 | 12/2006 | Elkins et al. |
| 6,429,403 B1 | 8/2002 | Nakayama | | 2007/0036260 A1 | 2/2007 | Fetterman et al. |
| 6,473,482 B1 | 10/2002 | Steinke | | 2007/0080328 A1 | 4/2007 | Zavodchikov et al. |
| 6,488,783 B1 | 12/2002 | King et al. | | 2007/0133734 A1 | 6/2007 | Fawcett et al. |
| 6,516,043 B1 | 2/2003 | Chaki et al. | | 2007/0165766 A1 | 7/2007 | Aleshin et al. |
| 6,519,309 B1 | 2/2003 | Van Swam | | 2007/0183556 A1 | 8/2007 | Labarriere et al. |
| 6,522,710 B2 | 2/2003 | Smith et al. | | 2007/0201605 A1 | 8/2007 | Ishii et al. |
| 6,539,073 B1 | 3/2003 | Smith et al. | | 2007/0206717 A1 | 9/2007 | Conner et al. |
| 6,542,566 B2 | 4/2003 | Adamson et al. | | 2007/0211843 A1 | 9/2007 | Smith, III et al. |
| 6,542,567 B1 | 4/2003 | Mayet et al. | | 2007/0242793 A1 | 10/2007 | Song et al. |
| 6,544,361 B1 | 4/2003 | Diz et al. | | 2008/0013667 A1 | 1/2008 | Oh et al. |
| 6,608,880 B2 | 8/2003 | Smith et al. | | 2008/0130820 A1 | 6/2008 | Ukai et al. |
| 6,608,881 B2 | 8/2003 | Oh et al. | | 2008/0144762 A1 | 6/2008 | Holden et al. |
| 6,621,885 B2 | 9/2003 | Brichet | | 2008/0152068 A1 | 6/2008 | Aktas et al. |
| 6,665,366 B2 | 12/2003 | Aujollet et al. | | 2008/0152069 A1 | 6/2008 | Aktas et al. |
| 6,690,758 B1 | 2/2004 | Elkins | | 2008/0179042 A1 | 7/2008 | Evans et al. |
| 6,707,872 B2 | 3/2004 | Yoon et al. | | | | |
| 6,714,619 B2 | 3/2004 | Oh et al. | | FOREIGN PATENT DOCUMENTS | | |
| 6,721,384 B2 | 4/2004 | Oh et al. | | DE | 1514124 | 9/1969 |
| 6,728,329 B2 | 4/2004 | Hirano et al. | | EP | 0080853 | 6/1983 |
| 6,744,842 B2 | 6/2004 | Schmidt et al. | | EP | 0620558 | 4/1994 |
| 6,758,917 B2 | 7/2004 | King et al. | | EP | 0871958 | 10/1998 |
| 6,807,246 B1 | 10/2004 | Kim et al. | | FR | 1444002 | 7/1966 |
| 6,819,733 B2 | 11/2004 | Broders et al. | | FR | 2632657 | 12/1989 |
| 6,845,138 B2 | 1/2005 | Chun et al. | | GB | 853511 | 11/1960 |
| 6,847,695 B2 | 1/2005 | Kageyama et al. | | GB | 1043782 | 9/1966 |
| 6,863,745 B1 | 3/2005 | Charquet et al. | | GB | 1068964 | 5/1967 |
| 6,884,304 B1 | 4/2005 | Charquet | | GB | 2229172 | 9/1990 |
| 6,888,911 B2 | 5/2005 | Stabel-Weinheimer et al. | | JP | 59-23830 | 2/1984 |
| 6,888,912 B2 | 5/2005 | Morel et al. | | JP | 63-134520 | 6/1988 |
| 6,901,128 B2 | 5/2005 | Mori et al. | | JP | 2018328 | 1/1990 |
| 6,909,766 B2 | 6/2005 | Kido et al. | | JP | 2221893 | 11/1990 |
| 6,925,138 B2 | 8/2005 | Nakamaru et al. | | JP | 3094195 | 4/1991 |
| 6,934,350 B1 | 8/2005 | Challberg et al. | | JP | 2003-248079 | 9/2003 |
| 6,943,315 B2 | 9/2005 | Cho et al. | | JP | 2004-20463 | 1/2004 |
| 6,960,326 B1 | 11/2005 | Webb et al. | | RU | 2176826 | 12/2001 |
| 6,991,731 B2 | 1/2006 | Koegler | | RU | 2222837 | 1/2004 |
| 7,037,390 B2 | 5/2006 | Miyahara et al. | | RU | 2246142 | 2/2005 |
| 7,085,340 B2 | 8/2006 | Goldenfield et al. | | WO | 85/01826 | 4/1985 |
| 7,087,206 B2 | 8/2006 | Bond et al. | | WO | 9316477 | 8/1993 |
| 7,127,024 B2 | 10/2006 | Garzarolli et al. | | WO | 97/08711 | 3/1997 |
| 7,169,370 B2 | 1/2007 | Mesmin et al. | | | | |
| 7,192,563 B2 | 3/2007 | Singh et al. | | | | |
| 7,195,745 B2 | 3/2007 | Brandel et al. | | | | |
| 7,309,473 B2 | 12/2007 | Caranoni et al. | | | | |
| 7,323,153 B2 | 1/2008 | Amamoto et al. | | | | |
| 2002/0122762 A1 | 9/2002 | Fukasawa et al. | | | | |
| 2003/0026381 A1 | 2/2003 | Ukai et al. | | | | |
| 2005/0031067 A1 | 2/2005 | Mori et al. | | | | |
| 2005/0069075 A1 | 3/2005 | D'Auvergne | | | | |
| 2005/0105677 A1 | 5/2005 | Yoon et al. | | | | |
| 2005/0157836 A1 | 7/2005 | Broach et al. | | | | |
| 2005/0226358 A1 | 10/2005 | Bonnamour et al. | | | | |
| 2005/0238131 A1 | 10/2005 | Hellandbrand, Jr. et al. | | | | |

OTHER PUBLICATIONS

European Search Report from corresponding Patent Application EP08172834 mailed Aug. 19, 2009.

Diakov, C., Feasibility of converting Russian icebreaker reactors from HEU to LEU fuel, Science and Global Security, vol. 14, pp. 33-48, 2006, Routledge Taylor & Francis Group.

European Search Report in related application No. EP 10 16 6457 mailed Aug. 11, 2010.

* cited by examiner

NUCLEAR REACTOR (ALTERNATIVES), FUEL ASSEMBLY OF SEED-BLANKET SUBASSEMBLIES FOR NUCLEAR REACTOR (ALTERNATIVES), AND FUEL ELEMENT FOR FUEL ASSEMBLY

CROSS-REFERENCE TO RELATED APPLICATIONS

This application claims the benefit of priority under the Paris Convention to PCT/RU2007/000732, filed Dec. 26, 2007, and to U.S. provisional patent application Ser. No. 61/116,730, filed Nov. 21, 2008, the content of both of which is incorporated herein by reference.

TECHNICAL FIELD

The invention relates in general to light water reactor designs in which thorium is used as fuel and in particular to designs of jacketless fuel assemblies, which make up the cores of pressurized water reactors (PWRs) such as the VVER-1000.

BACKGROUND

Nuclear power remains an important energy resource throughout the world. Many countries that lack adequate indigenous fossil fuel resources rely primarily on nuclear power to produce electricity. In many other countries, nuclear power is used as a competitive source of electricity which also increases the diversity of the types of energy used. In addition, nuclear power also makes a very important contribution to the achievement of such goals as controlling fossil fuel pollution (such as acid rain and global warming) and conserving fossil fuel for future generations.

Although safety is certainly a major issue in the design and operation of nuclear reactors, another key issue is the danger of the proliferation of materials that could be used in nuclear weapons. This danger is especially relevant to countries with unstable governments, whose possession of nuclear arms could pose a significant threat to world security. Nuclear power therefore should be generated and used in a way that does not lead to the proliferation of nuclear weapons and the resulting risk of their use.

All current nuclear reactors create large amounts of material customarily referred to as reactor-grade plutonium. A typical 1000 MW reactor, for example, creates about 200-300 kg per year of reactor-grade plutonium, which can be suitable for producing nuclear weapons. Hence the fuel discharged from the cores of conventional reactors is highly proliferative material, and security measures are required to prevent the discharged fuel from falling into the hands of unauthorized individuals. There is a similar security problem with the enormous stockpiles of weapons-grade plutonium created in the U.S. and the countries of the former Soviet Union in the process of dismantling of nuclear weapons.

There are other problems in the operation of conventional nuclear reactors associated with the constant need to dispose of long-life radioactive waste and the rapid depletion of worldwide supply of natural uranium raw material.

To solve these problems, there have been recent attempts to develop nuclear reactors that use relatively small amounts of nonproliferative enriched uranium (enriched uranium has a U-235 content of 20% or less) and do not generate significant amounts of proliferative materials such as plutonium. Examples of such reactors have been disclosed in international applications WO 85/01826 and WO 93/16477, which disclose seed-blanket reactors that obtain a substantial percentage of their power from blanket zones with thorium fuel. The blanket zones surround a seed zone containing fuel rods of nonproliferative enriched uranium. The uranium in the seed fuel rods releases neutrons which are captured by the thorium in the blanket zones, thus creating fissionable U-233, which burns in place and releases heat for the reactor power plant.

The use of thorium as nuclear reactor fuel is attractive because worldwide thorium reserves are considerably larger than uranium reserves. In addition, both of the aforementioned reactors are "nonproliferative" in the sense that neither the initial fuel loaded nor the fuel discharged at the end of each fuel cycle is suitable for producing nuclear weapons. This result is achieved by using only nonproliferative enriched uranium as seed fuel, selecting moderator/fuel volume ratios to minimize plutonium production, and adding a small amount of nonproliferative enriched uranium to the blanket zone, where the U-238 component is evenly mixed with the residual U-233 at the end of the blanket cycle and "denatures" (changes the natural properties of) the U-233, as a result of which it becomes unsuitable for making nuclear weapons.

Unfortunately, neither of the aforementioned reactor designs is truly "nonproliferative." In particular, it has been discovered that both of the designs result in a level of production of proliferative plutonium in the seed zone which is higher than the minimum possible level. The use of a circular seed zone with both an inner or central blanket zone and an outer, surrounding blanket zone cannot provide reactor operation as a "nonproliferative" reactor, since the thin, annular seed zone has a correspondingly small "optical thickness," which results in a seed (neutron) spectrum which dominates the considerably harder spectrum of the inner and blanket zones. This results in a higher proportion of epithermal neutrons in the seed zone and production of a higher than minimum quantity of proliferative plutonium.

In addition, neither of the previous reactor designs has been optimized from the standpoint of operational parameters. For example, moderator/fuel volume ratios in the seed zone and blanket zones are particularly critical for minimizing the amount of plutonium in the seed zone, so that adequate heat is released by the seed fuel rods, and optimum conversion of thorium to U-233 in the blanket zone is ensured. Research shows that the preferred moderator/fuel ratios indicated in the international applications are too high in the seed zones and too low in the blanket zones.

The previous reactor core designs also are not especially effective in consuming nonproliferative enriched uranium in the seed fuel elements. As a result, the fuel rods discharged at the end of each seed fuel cycle contained so much residual uranium that they had to be reprocessed for reuse in another reactor core.

The reactor disclosed in application WO 93/16477 also requires a complex mechanical reactor control system which makes it unsuitable for refitting a conventional reactor core. Similarly, the reactor core disclosed in application WO 85/01826 cannot easily be transferred into a conventional core, because its design parameters are not compatible with the conventional core parameters.

Finally, both of the previous reactor designs were designed specifically to burn nonproliferative enriched uranium with thorium and are not suitable for consuming large amounts of plutonium. Hence neither design provides a solution to the problem of stockpiled plutonium.

A reactor with a core which includes a set of seed-blanket assemblies, each of which contains a central seed region which includes seed fuel elements made of a material capable of nuclear fission containing uranium-235 and uranium-238, an annular blanket that surrounds the seed region and includes blanket fuel elements containing primarily thorium and 10% by volume or less enriched uranium, a moderator in the seed region, with a volume ratio of moderator to fuel in the range of 2.5 to 5.0, and a moderator in the blanket region, with a ratio of moderator to fuel in the range of 1.5 to 2.0, is known according to patent RU 2176826. Each of the seed fuel elements is made of uranium-zirconium alloy, and the seed zone makes up 25-40% of the total volume of each seed-blanket module.

The known reactor provides optimum operation from the standpoint of economy and is not "proliferative." This reactor can be used to consume large amounts of plutonium with the thorium without generating proliferative wastes. The reactor produces substantially smaller amounts of hot waste, which significantly reduces the need for long-term waste storage sites.

However, the seed-blanket assemblies used in the reactor are not suitable for use in existing light water reactors such as the VVER-1000.

A fuel assembly for a light water reactor similar to the reactor described above, which, specifically, has a hexagonal cross-sectional form, which makes it possible to install the fuel assembly from the seed-blanket modules in a conventional light water reactor, is known from the description for patent RU 2222837.

Other than the presentation of the cross-sectional form of the assembly, however, the description for the aforementioned patent contains no information on the configuration of the assembly which would allow installing it in an existing light water reactor such as the VVER-1000 without modifying the reactor design.

A fuel assembly for a light water reactor including a bundle of fuel elements and guide channels in spacer grids, a tailpiece and a head, wherein the spacer grids are connected to each other and to the tailpiece by elements arranged along the length of the fuel assembly, and the head is made up of upper and lower tieplates, cladding situated between the plates, and a spring unit, and wherein outer ribs on the head shell are connected to each other along projections of the rim and along the lower parts by perforated plates, is known according to patent RU 2294570.

The known fuel assembly is classified as a design for jacketless fuel assemblies, which make up the cores of pressurized water reactors (PWRs) such as the VVER-1000, and has enhanced operating properties due to increased rigidity, reduced head length and increased free space between the fuel rod bundle and the head, with a simultaneous increase in the length of the fuel rods. This design makes it possible to increase the fuel load in the fuel assembly with greater depletion depth and thereby to increase the reactor core power and the life cycle of the fuel assembly.

However, all the fuel elements in this assembly are made of the fissionable material traditionally used in reactors such as the VVER-1000; consequently, the creation of large amounts of reactor-grade plutonium is a characteristic drawback of reactors with such assemblies.

One object of one or more embodiments of the invention is the creation of a fuel assembly which, on the one hand, generates a substantial percentage of its power in a thorium-fueled blanket region and does not create proliferative wastes and, on the other hand, can be installed in an existing light water reactor such as the VVER-1000 without requiring substantial modifications.

SUMMARY OF EMBODIMENTS OF THE INVENTION

This object and/or other objects, according to one of the embodiments of the invention, are achieved by a fuel assembly for a light water reactor having in plan the form of a regular hexagon contains a seed subassembly, a blanket subassembly surrounding it, a head, a tailpiece and a frame structure, wherein the seed subassembly contains a bundle of fuel elements, each of which has a kernel comprised of enriched uranium or reactor-grade plutonium, with the said kernel being enclosed by a cladding made of zirconium alloy and having a three-lobed profile forming spiral spacer ribs; the tailpiece of the seed subassembly with a support grid attached to it to hold the fuel elements of the seed subassembly; a channel connected to the tailpiece of the seed subassembly having in plan the form of a regular hexagon, with channel placed around the fuel rod bundle; a guide grid attached to the upper part of the channel for placing fuel elements so as to allow their free axial movement; a central tube forming a guide channel to accommodate controls, and peripheral tubes attached to the support grid, which form guide channels for inserting absorber rods and control rods, and placed in the head with the capability of elastic axial displacement; the blanket subassembly includes a frame structure comprised of six lengthwise angle units with spacer grids attached to them, with an opening in the central area to accommodate the channel of the seed subassembly; a bundle of fuel elements comprised of thorium with an addition of enriched uranium situated in the frame structure; and the tailpiece of the blanket subassembly, to which fuel elements of the blanket subassembly are attached, and which can be coupled with the support tube of the light water reactor, with the said tailpiece of the blanket subassembly and the tailpiece of the seed subassembly being attached by a locking mechanism and forming the tailpiece of the fuel assembly.

The head can be equipped with a pressure element that is in contact with the channel of the seed subassembly.

In another embodiment of the invention, a fuel assembly having in plan the form of a regular hexagon contains a seed subassembly, a blanket subassembly surrounding it, a head, a tailpiece that can be coupled with the support tube of the light water reactor and a frame structure, wherein the seed subassembly contains a bundle of fuel elements, each of which has a kernel comprised of enriched uranium or reactor-grade plutonium, with the said kernel being enclosed by a cladding made of zirconium alloy and having a three-lobed profile forming spiral spacer ribs; the tailpiece of the seed subassembly with a support grid attached to it to hold the fuel elements of the seed subassembly; a channel connected to the tailpiece of the seed subassembly having in plan the form of a regular hexagon, with the channel placed around the fuel rod bundle; a guide grid attached to the upper part of the channel for placing fuel elements so as to allow their free axial movement; a central tube forming a guide channel to accommodate controls, and peripheral tubes, which form guide channels for inserting absorber rods and control rods, and placed in the head with the capability of elastic axial displacement; the blanket subassembly includes a frame structure comprised of six lengthwise angle units with spacer grids attached to them, with an opening in the central area to accommodate the channel of the seed subassembly; a bundle of fuel elements comprised of thorium with an addition of enriched uranium situated in the frame structure and attached to the bottom tie plate (the tailpiece); and several support tubes attached to the tailpiece, with the head equipped to allow elastic axial displacement of the support tubes.

Displacer of zirconium or zirconium alloy having the cross-sectional form of a regular triangle is situated primarily along the longitudinal axis of the kernel in at least one of the embodiments of the invention to promote more uniform temperature distribution in the kernel volume.

The axial coiling pitch of the spiral spacer ribs also ranges from 5% to 20% of the fuel rod length in at least one of the embodiments of the invention.

In addition, the fuel rods of the seed subassembly in at least one embodiment of the invention have a circumferential orientation such that the three-lobed profiles of any two adjacent fuel rods have a common plane of symmetry which passes through the axes of the two adjacent fuel elements in at least one cross section of the fuel rod bundle.

Also in at least one of the embodiments of the invention, the kernel preferably is comprised of U—Zr alloy with up to 30% by volume uranium, with up to 20% enrichment with the U-235 isotope, and the kernel is comprised of Pu—Zr alloy with up to 30% by volume reactor-grade plutonium.

In addition, an object of one or more embodiments of the invention is a light water reactor containing a set of fuel assemblies, at least one of which is construction according to one of the alternative configurations described above. Either some or all of the fuel assemblies placed in the reactor may conform to the alternatives described above.

One or more embodiments of the present invention provides a fuel element for use in a fuel assembly of a nuclear reactor. The fuel element includes a kernel comprising fissionable material. The fuel element has a multi-lobed profile that forms spiral ribs. There may be three ribs. The fuel element may include a cladding enclosing the kernel, and the cladding may include a zirconium alloy. The fuel element may include a displacer with a cross sectional shape in the form of a regular triangle, the displacer extending along a longitudinal axis of the kernel. The displacer may comprise zirconium or a zirconium alloy.

One or more embodiments of the present invention provides a fuel element for use in a fuel assembly of a nuclear reactor. The fuel element includes a central displacer extending along a longitudinal axis of the fuel element. The displacer includes projections that extend laterally outward. The fuel element also includes a kernel extending laterally outwardly from the displacer. The kernel includes fissionable material and includes a plurality of ribs that extend laterally outward. The projections are aligned with respective ribs. The projections and their respective ribs may have matching twists along their longitudinal axes. In a cross-section of the fuel element that is perpendicular to the longitudinal axis, the kernel may surround the displacer. The plurality of ribs may include circumferentially equally-spaced ribs, wherein a cross sectional shape of the displacer has the form of a regular polygon having a corner for each of said ribs. For example, the plurality of ribs may include three circumferentially equally-spaced ribs, wherein a cross sectional shape of the displacer has the form of a regular triangle. The apexes of the regular triangle may be aligned with the lobes of the kernel.

One or more embodiments of the present invention provides a fuel assembly for use in a nuclear reactor. The fuel assembly includes a seed subassembly comprising a seed frame and a plurality of seed fuel elements supported by the seed frame. The fuel assembly also includes a blanket subassembly comprising a blanket frame and a plurality of blanket fuel elements supported by the blanket frame. The fuel assembly further includes a locking mechanism that releasably locks the seed and blanket frames together. The seed assembly is detachable from the blanket subassembly when the locking mechanism is released. The blanket subassembly may laterally surround the seed subassembly. The blanket subassembly may include a central opening into which the seed subassembly fits. The plurality of seed fuel elements may include fissionable material, and the plurality of blanket fuel elements may comprise thorium.

One or more embodiments of the present invention provides a method of using a fuel assembly according to one or more of the above embodiments. The seed and blanket subassemblies are attached to each other. The method includes, sequentially:
 (a) placing the fuel assembly in a core of a nuclear reactor;
 (b) burning at least some of the fissionable material in the core of the nuclear reactor;
 (c) detaching the seed subassembly from the blanket subassembly; and
 (d) attaching a new seed subassembly to the blanket subassembly, the new seed subassembly comprising additional fissionable material.

The method may also include:
 (e) burning at least some of the additional fissionable material in the core of the nuclear reactor.

Additional and/or alternative objects, features, aspects, and advantages of one or more embodiments of the present invention will become apparent from the following description, the accompanying drawings, and the appended claims.

BRIEF DESCRIPTION OF THE DRAWINGS

The features and advantages of various embodiments of this invention will be apparent from the following detailed description of the preferred embodiments thereof together with the attached drawings, in which.

DETAILED DESCRIPTION OF EXEMPLARY EMBODIMENTS

Figure 1:
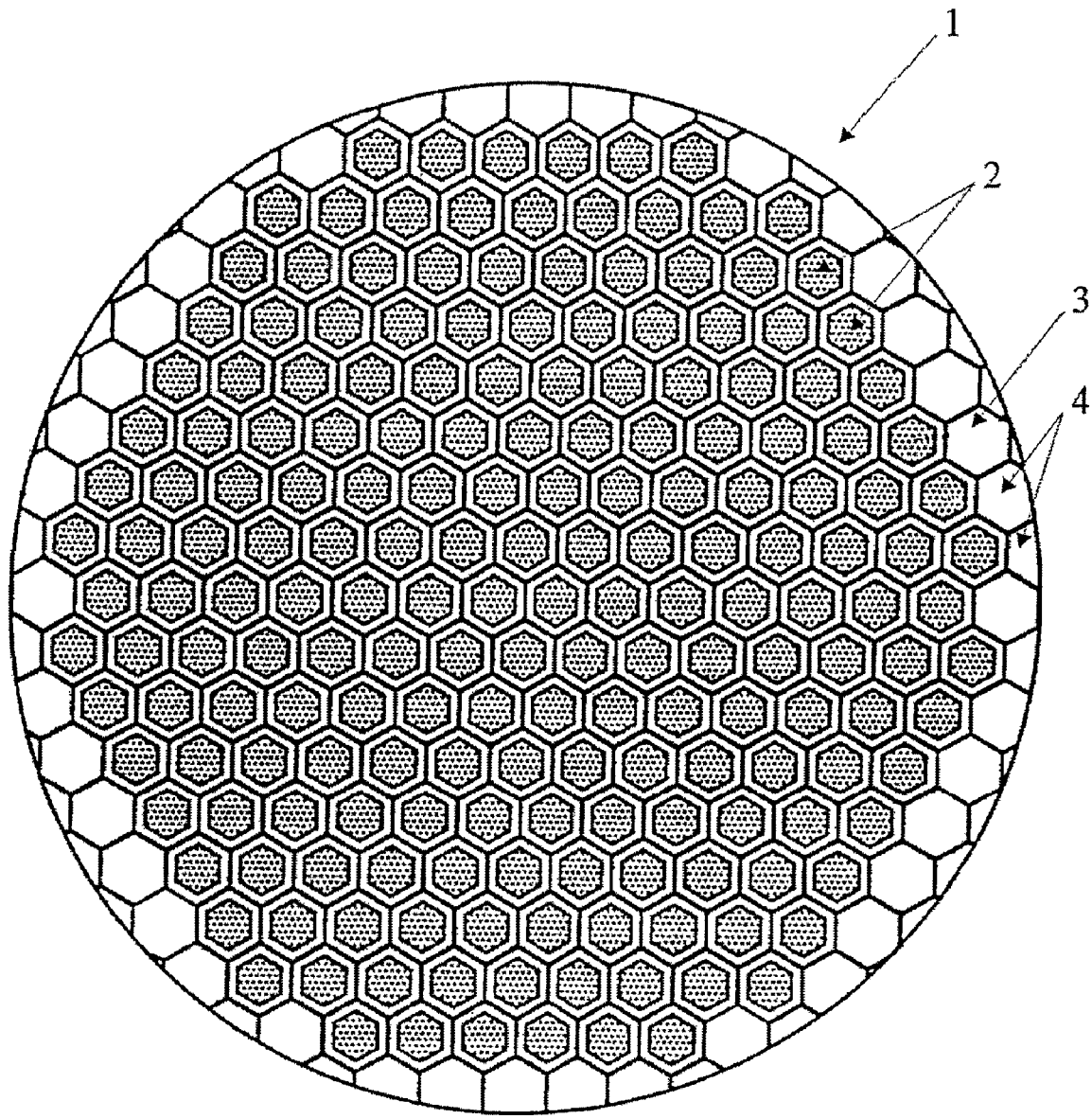
FIG. 1 is a schematic cross-sectional illustration of a nuclear reactor core containing fuel assembles constructed according to an embodiment of this invention.

FIG. 1 shows the a nuclear reactor core 1 containing a set of fuel assemblies 2 which include a seed region and a blanket region, which form a hexagonal configuration, wherein the fuel assemblies themselves have in plan the form of a regular hexagon. The core 1 has the same geometric configuration and dimensions as the core in a conventional VVER-1000 light water reactor, so that the reactor can be refitted with such assemblies to form a core of 163 fuel assemblies 2. The difference between the core 1 and the core of the VVER-1000 reactor lies in the composition and structure of the fuel assemblies 2, as will be disclosed in greater detail below. The core 1 and fuel assemblies 2 presented here have been developed for use in a conventional VVER-1000 light water reactor; however, a similar core and fuel assemblies can be created for use in other standard or specially designed reactors without going beyond the scope of this invention.

The core 1 is surrounded by a reflector 3, which preferably is comprised of a set of reflector assemblies 4. Each reflector assembly 4 preferably contains a mixture of water and metal of the core basket/high-pressure vessel. In addition, easy reflector assembly 4 may be comprised primarily of thorium oxide.

Figure 2:
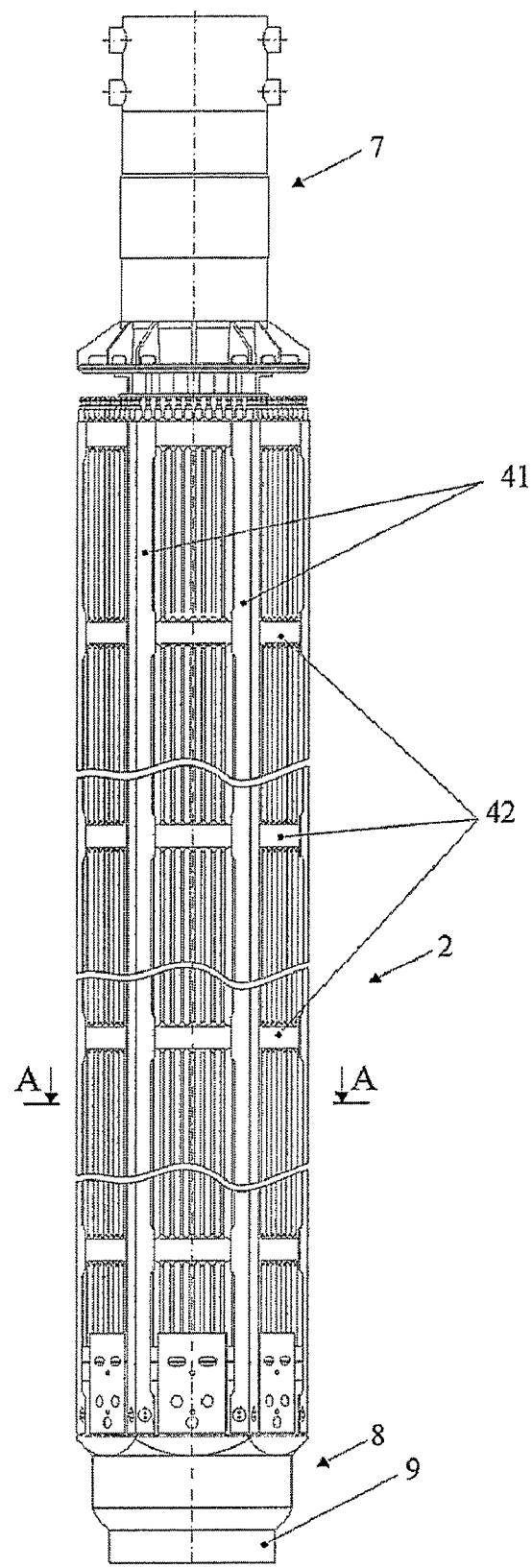
FIG. 2 is a general side view of a fuel assembly according to the first embodiment of the invention, including cutaway views.

FIG. 2 shows a general view of the first alternative configuration for each of the fuel assemblies 2.

Figure 5:
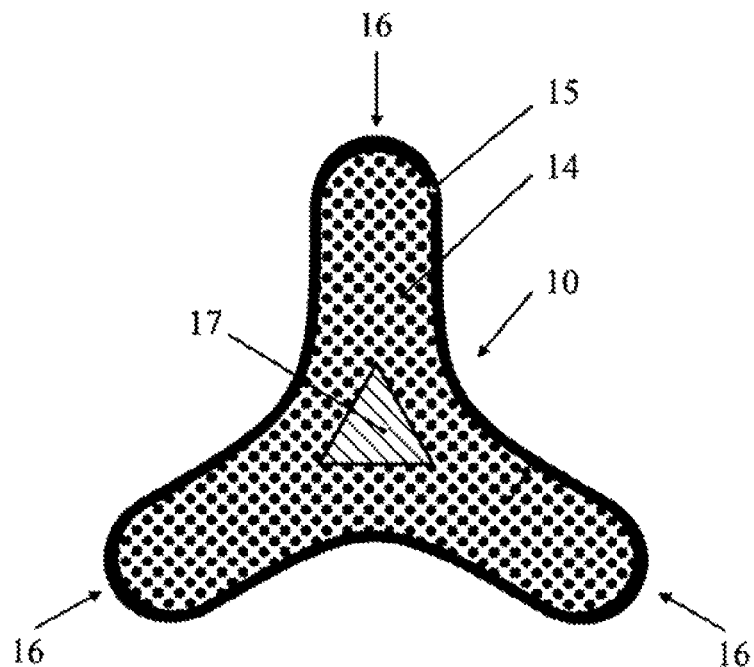
FIG. 5 is a cross-sectional view of a seed fuel rod.
Figure 6:
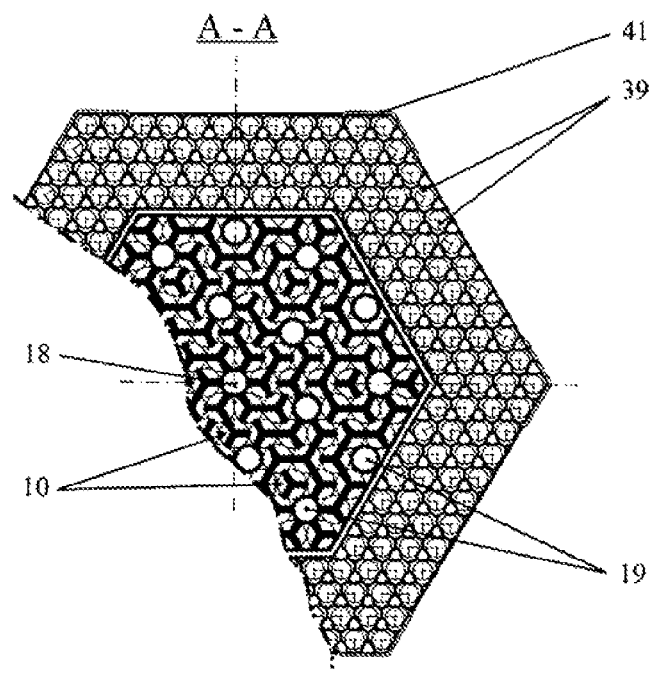
FIG. 6 is the A-A cross-sectional view of the fuel assembly as per FIG. 2.

A fuel assembly 2 contains a seed subassembly 5, a blanket subassembly 6 surrounding it, a head 7, and a tailpiece 8 with its supporting part 9 in contact with the support tube of the reactor (not shown). The fuel assembly has in plan the form of a regular hexagon. The seed subassembly 5 contains a fuel rod bundle 10 which includes a number of rods, such as 108, placed on a support grid 11, which is attached to the tailpiece of the seed subassembly 5. A channel 12 with a hexagonal cross section is connected to the tailpiece of the seed subassembly 5 and encloses the fuel rod bundle 10. A guide grid 13 for placing fuel elements 10 so as to allow their free axial movement is attached to the upper part of the channel 12. Each of the seed fuel elements has a kernel 14, which includes enriched uranium or reactor-grade plutonium. The kernel is comprised primarily of U—Zr alloy, with a uranium concentration of 25% or less by volume in the fuel composition and 19.7% uranium-235 enrichment. The kernel 14 is enclosed by cladding 15 of zirconium alloy and has a three-lobed profile forming spiral spacer ribs 16 (FIG. 5). A displacer 17 of zirconium or zirconium alloy with the cross-sectional form of a regular triangle is placed along the longitudinal axis of the kernel. The seed fuel rods 10 may be fabricated as a single assembly unit by joint pressing (extrusion through a die). The axial coiling pitch of the spiral spacer ribs 16 is selected according to the condition of placing the axes of adjacent fuel rods 10 with a spacing equal to the width across corners in the cross section of a fuel rod and is 5% to 20% of the fuel rod length. Stability of the vertical arrangement of the fuel rods 10 is provided: at the bottom—by the support grid 11; at the top—by the guide grid 13; relative to the height of the core—by a system of bands (not shown) spaced evenly in the channel relative to the height of the bundle. The seed fuel elements 10 have a circumferential orientation such that the three-lobed profiles of any two adjacent fuel rods have a common plane of symmetry which passes through the axes of the two adjacent fuel elements (FIG. 5) in at least one cross section of the fuel rod bundle.

In addition, the seed subassembly contains a central tube 18 that forms a guide channel to accommodate controls, and peripheral tubes 19 attached to the support grid 13 which form guide channels for inserting control absorber elements based on boron carbide ($B_4C$) and dysprosium titanate ($Dy_2O_3.TiO_2$) (not shown) and burnable absorber rods based on boron carbide and gadolinium oxide ($Gd_2O_3$) (not shown) and are placed in the head 7 with the capability of elastic axial displacement. The peripheral tubes 19 that form the guide channels are made of zirconium alloy.

The head 7 (FIG. 3) is comprised of a spring unit, which includes precompressed springs 20, an upper plate 21, cladding 22 and a lower plate 23. The cladding 22 is comprised of two telescoped parts: the upper part 24 rigidly connected to the upper plate 21, and the lower part 25 rigidly connected to the lower plate 23. The spring unit including the springs 20 is placed inside the cladding 22. The peripheral tubes 19 fit into sleeves 26 and are capable of acting on the bottom ends of the sleeves (due to the presence of a step on the outer surface of the tube 19, for example). The sleeves 26 have flanges against which the compression springs of the spring unit 20 rest. The other ends of the springs 20 rest against the upper plate 21. The upper ends of the tubes 19 pass freely through openings in the upper plate 21, and the sleeves 26 pass through openings in the lower plate 23. The tubes 19 have stops 27 at the top ends. The central tube 18 is installed in a manner similar to the peripheral tubes 19, except that it passes freely through the lower plate without the use of a sleeve. The spring 20 through which the central tube 18 passes rests directly against the lower plate 23 of the head 7. A stay 28 with a stop 29 at the upper end is attached to the lower plate 23 to limit the distance between the plates 21 and 23; the stay 28 passes freely through an opening in the upper plate 21. A pressure element 30 in contact with the channel 12 of the seed subassembly 5 is attached to the lower plate 23. Hence a load applied to the upper plate 21 with the channel 12 fixed against axial movement is transmitted to the support grid 11 both by way of the peripheral tubes 19 and directly through the channel 12.

The head may be constructed without the sleeves 26. In that case, all the springs 20 of the spring unit rest against the lower plate 23, and the peripheral tubes 19 pass freely through matching openings in the lower plate 23 (similar to the central tube 18). The entire load applied to the upper plate 21 with the channel 12 fixed against movement is transmitted to the support grid 11 directly through the channel 12.

The tailpiece of the seed subassembly 5 has a locking device 31 attached to the casing which includes a cylindrical wall 32 with openings 33, balls 34 placed in the openings, and a locking element 35 with an annular slot 36 capable of axial movement. The locking device 31, which provides connection of the seed subassembly 5 with the tailpiece 37 of the blanket subassembly, can be also be constructed in any other form; it is important only that it provide a detachable connection of the tailpieces of the seed and blanket subassemblies.

The blank subassembly 6 includes a frame structure 38, a bundle of fuel rods 39 situated in the frame, and a tailpiece 40.

The frame structure 38 is comprised of six lengthwise angle units 41 with spacer grids 42 attached to them by resistance spot welding. Each spacer grid 42 is a honeycomb grid forming a set of cells (specifically 228) attached to the rim in outer and inner hexagons. The spacer grid 42 provides the required spacing of the fuel rods 39 and the required length of contact with them to allow the fuel rods 39 to slide in the spacer grid cells when they expand in length due to radiation and heat, the minimum possible sliding forces for the fuel rods to reduce internal stresses in the bundle, and the required initial tightness to avoid fretting corrosion of the fuel elements during operation. The spacer grids 42 have an opening in the central area to accommodate the channel 12 of the seed subassembly 5.

The angle units are rigidly connected in the lower part to the tailpiece 40 of the blanket subassembly 6, to which the support grid 43 of the blanket subassembly to hold the fuel rods 39 is attached. The support grid 43 of the blanket subassembly 6 provides mechanical strength under loads in modes with normal operating conditions, modes with violations of normal operating conditions, and design accidents and also provides the hydraulic resistances required according to calculations.

The fuel rod bundle 39 of the blanket subassembly includes a set of fuel elements (specifically 228 elements) made of a composition including 12% by volume $UO_2$ and 88% by volume $ThO_2$ with 19.7% U-235 enrichment.

The ratio of the volume of all fuel elements of the seed subassembly $V_{seed}$ to the volume of all fuel elements of the blanket subassembly $V_{blank}$ is approximately 0.72.

The tailpiece 40 of the blanket subassembly 6 includes a support grid 43, a casing 44 and a ring 46 rigidly connected to it by braces 45; the ring interacts with the locking device 31. The ends of the blanket fuel elements 39 are attached to the support grid 43. The support grid 43 provides mechanical strength under loads modes with normal operating conditions, modes with violations of normal operating conditions, and design accidents and also provides the required hydraulic resistance to the flow of coolant (water). The casing 44 can be coupled with the support tube (not shown) of the light water reactor and acts as a guide device for delivering coolant to the areas of the seed and blanket subassemblies.

Figure 7:
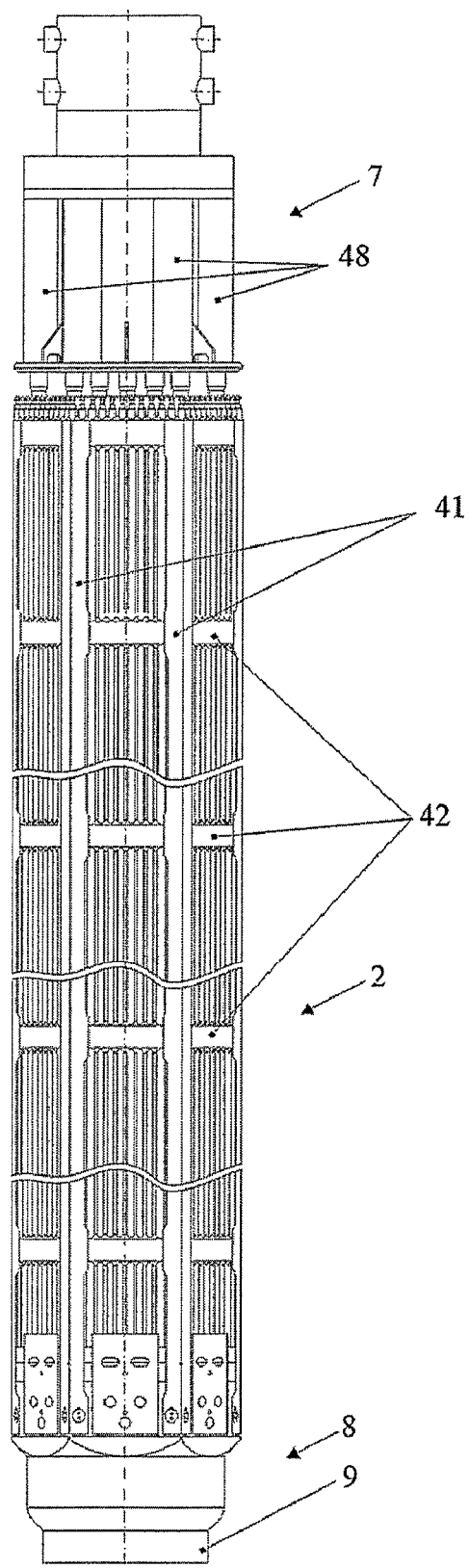
FIG. 7 is a general side view of a fuel assembly according to the second embodiment of the invention, including cutaway views.
Figure 8:
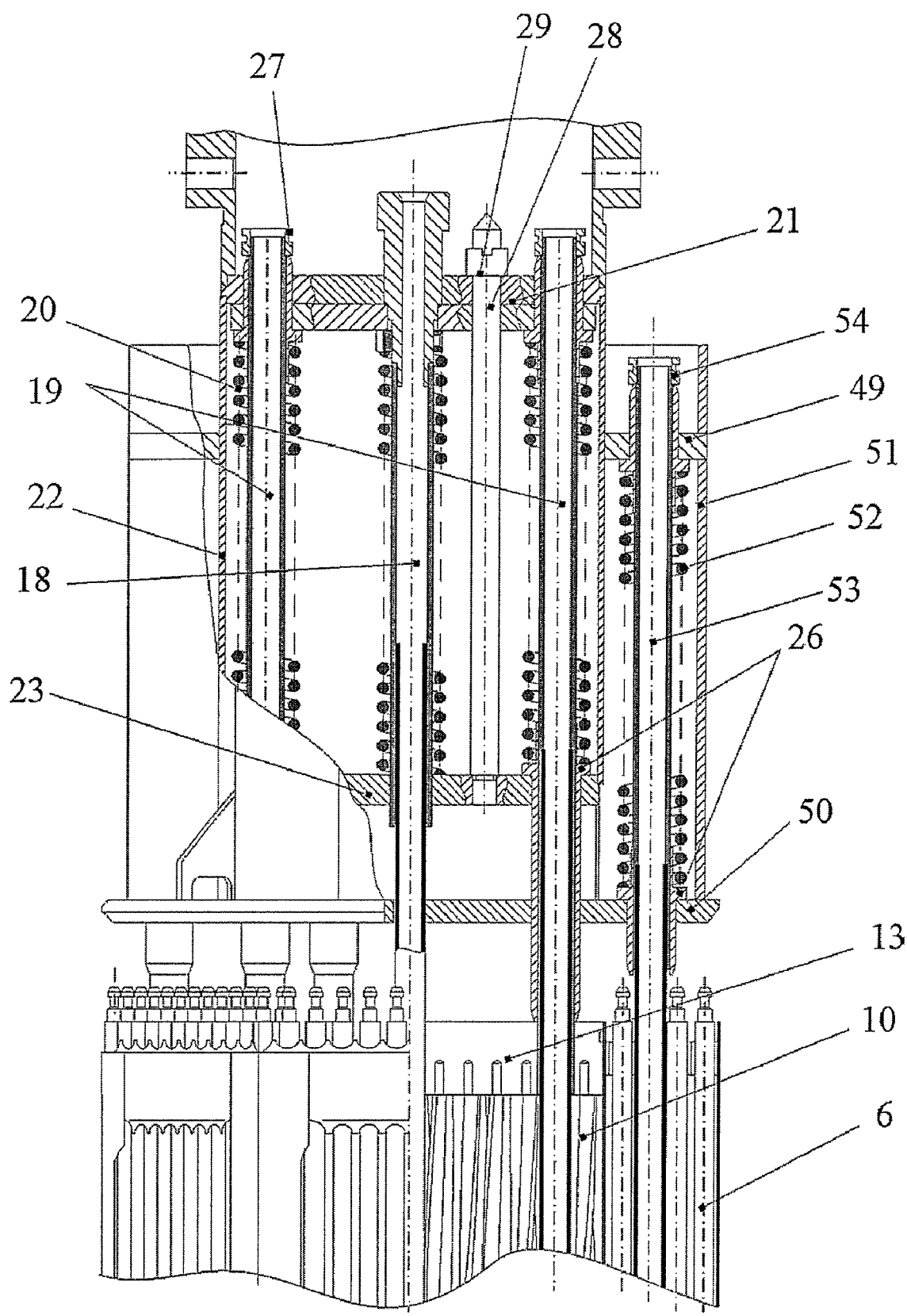
FIG. 8 is the head of the fuel assembly as per FIG. 7 in enlarged longitudinal section view.
Figure 9:
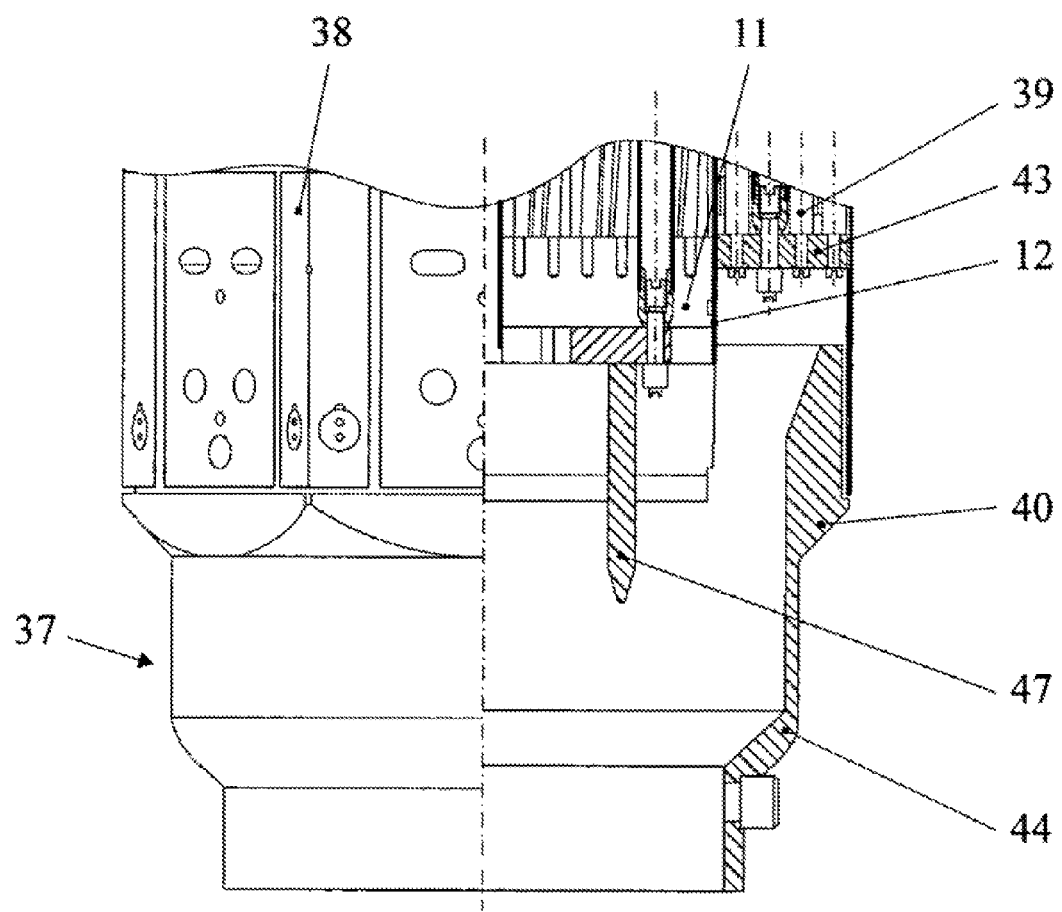
FIG. 9 is the tailpiece of the fuel assembly as per FIG. 7 in enlarged longitudinal section view.

FIGS. 7-9 show the second alternative for construction of each of the fuel assemblies 2.

Figure 3:
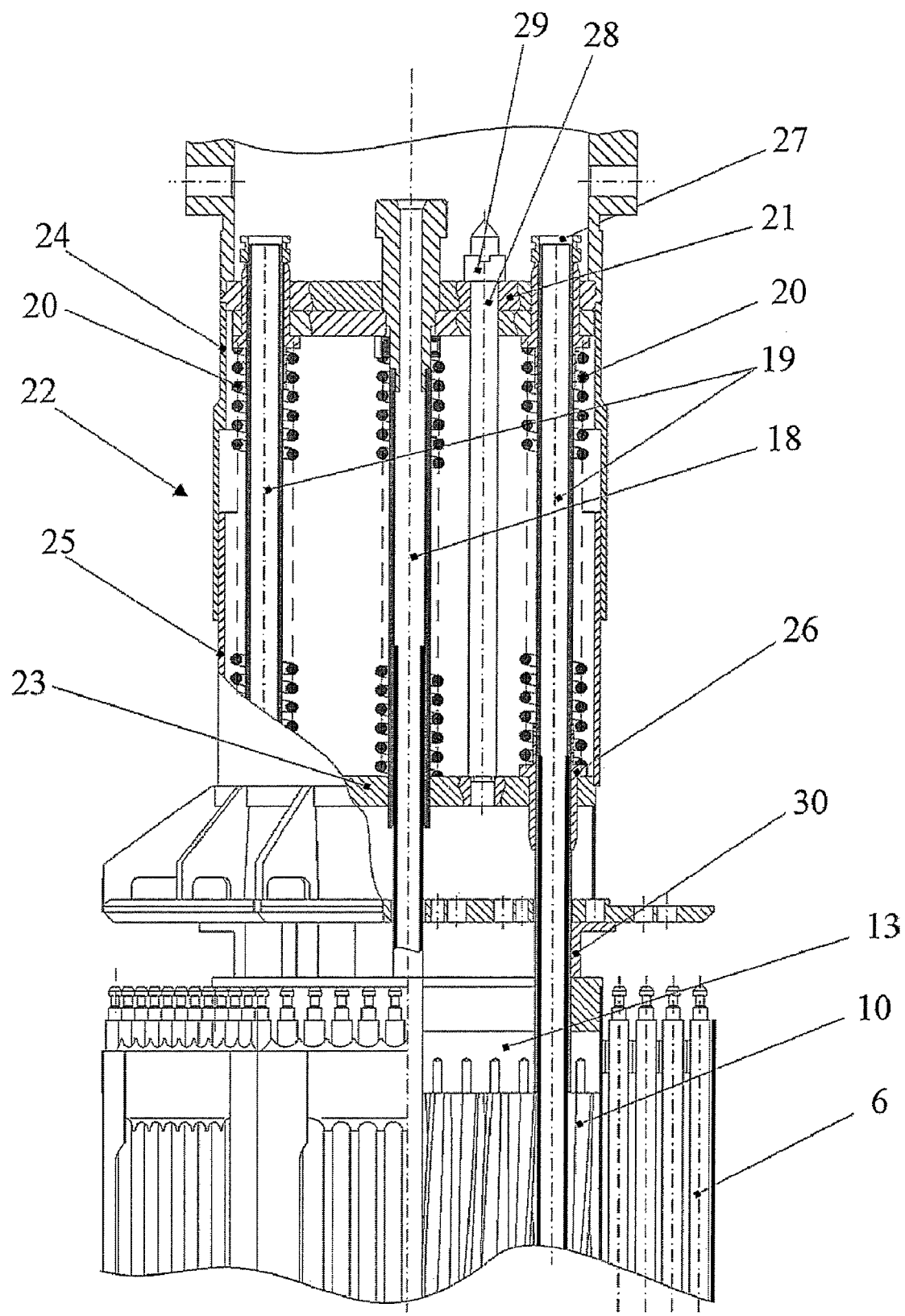
FIG. 3 is the head of the fuel assembly as per FIG. 2 in enlarged longitudinal section view.
Figure 4:
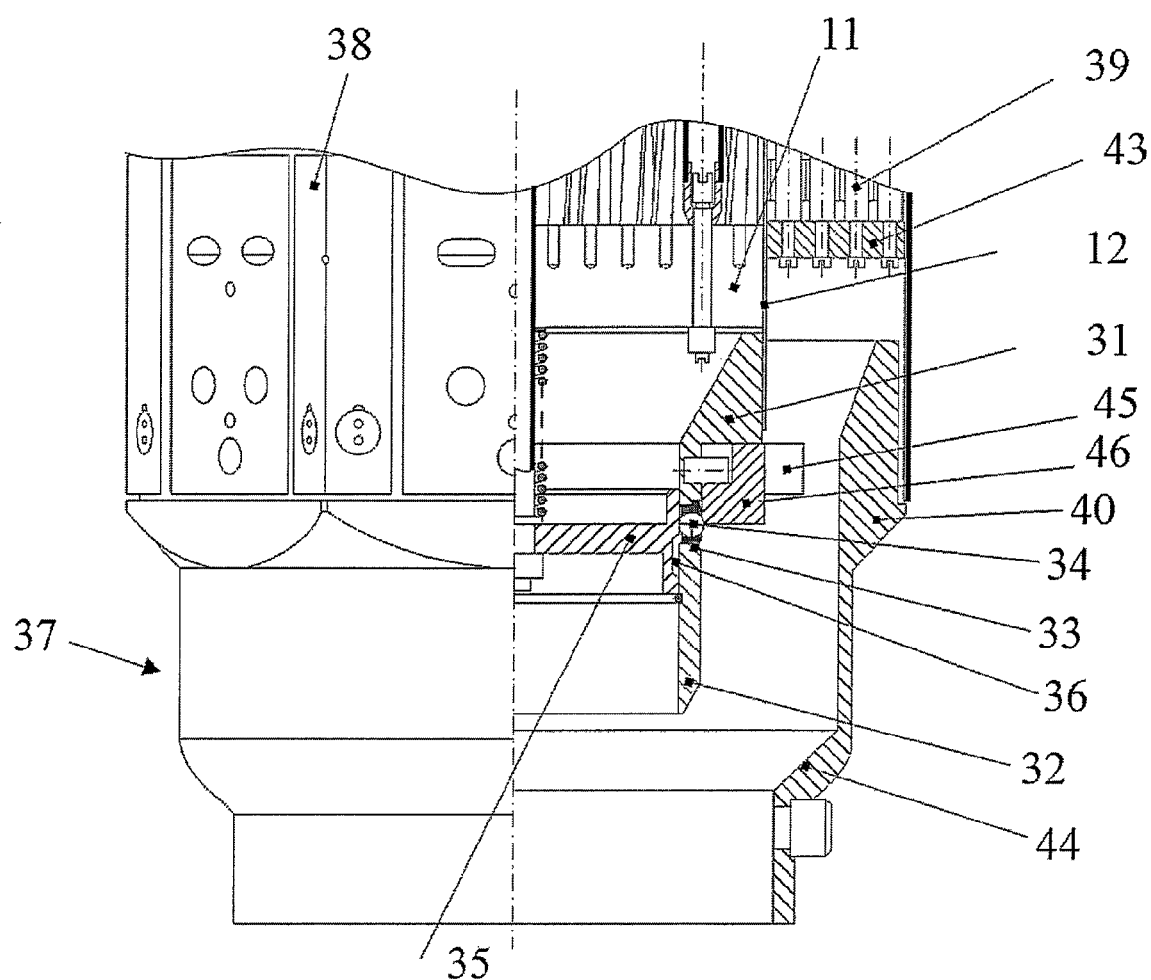
FIG. 4 is the tailpiece of the fuel assembly as per FIG. 2 in enlarged longitudinal section view.

This alternative design differs from the design shown in FIGS. 2-4 in that the seed and blanket subassemblies are not rigidly connected to each other. As shown in FIG. 9, the tailpiece of the seed subassembly has a cylindrical bottom tie plate 47 instead of the locking device 31, and the casing 44 in the tailpiece of 40 of the blanket subassembly 6 lacks braces 45 and ring 46 shown in FIG. 4. The cladding 22 of the head 7 (FIG. 8), in contrast to the version shown in FIG. 3, is constructed in one piece, and an additional spring unit 48 is rigidly attached (e.g., welded) to it. The additional spring unit 48 chiefly includes several (e.g., six) additional upper plates 49 evenly distributed around the circumference and rigidly connected to the cladding 22, an additional lower plate 50 rigidly linked to the lower plate 23, cladding 51 attached to the additional plates 49 and 50, compression springs 52 and support tubes 53. The support tubes 53 are attached by the bottom ends to the support grid 43 of the blanket module 6. The upper parts of the support tubes 53 are constructed and positioned in the additional upper and lower plates 49 and 50 similar to the peripheral tubes 19; i.e., the tubes 53 fit into sleeves 26 and are capable of acting on the sleeves in an upward direction. The compression springs 52 of the additional spring unit 48 rest at one end against flanges of the sleeves 26 and at the other end against the additional upper plates 21. The upper parts of the support tubes 53 pass freely through openings in the additional upper plates 49, and the sleeves 26 pass through openings in the additional lower plate 50. The support tubes 53 have stops 54 at the top ends.

Before a fuel assembly is placed in the reactor, the seed subassembly 5 and the blanket subassembly 6 are first assembled separately.

In assembly of the seed subassembly according to the first embodiment, the fuel elements 10 are connected to the guide grid 13 attached to the channel 12, and the central tube 18 and peripheral tubes 19 are connected to the head, in addition to being attached to the guide grid 13. The tubes 18 and 19 pass through sleeves 17 situated in openings in the lower plate, through the springs 20 and through openings in the upper plate 21. Then the stops 27 are attached to the top ends of the tubes (by a threaded or bayonet joint, for example).

The fuel elements 39 of the blanket subassembly are placed in a frame structure 9 by passing them through spacer grids 42 and attaching them to the support grid 43.

Then the assembled seed and blanket subassemblies are connected to form a single fuel assembly by passing the channel 12 of the seed subassembly 5 through openings in the central part of the spacer grids 42. The configuration of these openings in the central part of the spacer grids 42 matches the cross-sectional shape of the channel 12, so that the channel 12 passes freely through the openings. The locking element 35 in the tailpiece of the seed subassembly is shifted upward, so that the balls 34 situated in openings 33 of the cylindrical wall 32 are capable of movement in an annular groove 36, thus allowing the cylindrical wall 32 to pass through the ring 46. After the tailpiece of the seed subassembly is stopped against the upper end face of the ring 46, the locking element 36 is shifted downward. The balls 34 are forced out of the groove 36, shift outward in the openings 33 and jut out of the wall 32. As a result, due to interaction of the displaced balls and the bottom end face of the ring 46, the tailpiece of the seed subassembly cannot move upward in relation to the tailpiece of the blanket subassembly. Thus the seed and blanket subassemblies form a single fuel assembly 2.

After a fuel assembly 2 is placed in the reactor 1, and the tailpiece 8 is resting in the support tube (not shown) of the light water reactor, the fuel assembly 2 is held down by the upper plate of the reactor (not shown) by resting against the face of the cladding of the upper plate 21 of the head 7. Then the force is transmitted to the spring unit with springs 20, which is compressed by an amount designed to keep the fuel assembly 2 from floating up in the flow of coolant from below; the upper plate 21 of the head 7 moves downward in relation to the lower plate 23 by the amount of compression of the spring unit. The possibility of downward movement of the upper plate 21 relative to the lower plate 23 of the head 7 is provided by telescoping of the upper part 24 of the cladding 22, which is rigidly connected to the upper plate 21, and the lower part 25 of the cladding 22, which is rigidly connected to the lower plate 23.

Then the force from the bottom ends of the springs 20 of the spring unit is transmitted through the sleeves 26, acting on the peripheral tubes 19 by their bottom ends, to the peripheral tubes 19 and then to the support grid 11 and through the tailpiece of the seed subassembly, the locking device 31, the ring 46 and the braces 45 to the tailpiece 44 of the blanket subassembly 6, which comes into contact with the support tube (not shown) of the light water reactor.

In addition, part of the compression force from the upper plate of the reactor is transmitted to the channel 12 of the seed subassembly by the action on the pressure element 30 of the force of a spring 20 enclosing the central tube 18 and resting directly against the lower plate 23, which is rigidly connected to the pressure element. If the head 7 does not have sleeves 26, the entire compression force is transmitted by way of the channel 12.

Coolant passes into the fuel assembly 2 through the casing 44 of the tailpiece of the blanket subassembly 6; the coolant flow is divided into two parts, one of which runs inside the casing 12 of the seed subassembly and bathes the seed fuel elements 10, while the other runs outside the case 12 and bathes the fuel elements 39 of the blanket subassembly.

The compression force of the head 7 acting from the upper plate of the reactor (not shown) keeps the fuel elements from floating up in the specified coolant flow.

The passage of the required (for extracting nominal power from the fuel assembly) coolant flow through the seed and blanket subassemblies at the nominal pressure gradient (used in existing VVER-1000 reactors) relative to the height of the fuel assemblies with preservation of the serviceability of the assemblies is provided:

by the use of a channel 12 between the seed and blanket subassemblies;
  by the shape of the seed fuel elements 10 (three-lobed profile), their mutual circumferential orientation and the axial coiling pitch of the spiral spacer ribs 16, which promotes a well-developed heat-transfer surface and a significantly more even coolant temperature distribution in the cross section of the seed subassembly due to forced convective mixing of the coolant.

The complete hydraulic characteristics of the fuel assembly 2 practically coincide with the characteristics of a standard fuel assembly, which ensures maintaining the resistance of the core of a VVER-1000 reactor with fuel assemblies according to one or more embodiments of the invention at the nominal level. Hence installing fuel assemblies according to one or more embodiments of this invention in a VVER-1000 will not cause a change in the coolant flow rate in the primary loop of the reactor.

The fuel elements 10 of the seed subassembly, as they heat up during operation, begin to lengthen upward due to thermal and radiation expansion; the bundle of fuel elements expands independently of peripheral tubes 19, since the latter pass through the cells of the guide grid 13 with a guaranteed clearance. Hence the bundle of fuel elements 10 has no effect on the load-bearing peripheral tubes 19 and does not deform them; consequently, geometric stability of the form of the fuel assembly 2 is preserved during operation.

The fuel elements 39 of the blanket subassembly expand in length during operation and begin to take up the free space between their ends and the head 7 due to radiation expansion.

The operation of a fuel assembly 2 according to the second embodiment of the invention is similar, except that the casing 44 of the blanket subassembly is pressed against the support tube of the reactor by transmission of the compression force from the upper plate of the reactor through the support tubes 53, and the seed subassembly, which is not attached to the blanket subassembly, is prevented from floating up by the action of the springs 20 against the flanges of the sleeves 26, which transmit the force to the support grid 11 of the seed subassembly.

The use of one or more embodiments of this invention makes it possible to achieve a saving of natural uranium due to the presence of a thorium part (blanket subassembly) in the fuel assembly design, since the thorium during the depletion process accumulates secondary nuclear fuel in the form of uranium-233, burning of which makes a substantial contribution to the power output of a reactor core with such fuel assemblies. This leads to an improvement in nonproliferation characteristics and simplifies the problems in handling spent fuel assemblies, since the accumulation of the traditional secondary nuclear fuel (reactor-grade plutonium, which can be used to produce nuclear weapons) for VVER-1000 reactors is reduced significantly (by 80%), and the new secondary nuclear fuel, uranium-233 (or more accurately, what is left after it burns "in place" in a thorium blanket module), is not usable for producing nuclear weapons due to contamination with the uranium-232 isotope and even isotopes of plutonium. Problems in handling spent fuel assemblies can be simplified by reducing the volume of waste by increasing the specified life cycle of the fuel and reducing the content of isotopes with long-term radiation toxicity in discharged fuel.

The fuel assembly design according to one or more embodiments of this invention makes it possible to use the fuel assembly in VVER-1000 reactors due to both mechanical and hydraulic and neutronic compatibility with the design of standard fuel assemblies.

Mechanical compatibility with the standard fuel assembly for the VVER-1000 reactor is ensured by:
 the presence of a frame structure that provides resistance to deformation during long-term operation and high fuel depletion levels;
 identical connection dimensions;
 the use of tailpiece, head and frame structure designs compatible with the corresponding parts of corner standard fuel assemblies;
 compatibility of the seed subassembly design with standard control mechanisms and load-handling devices.

The complete hydraulic characteristics of a fuel assembly according to one or more embodiments of this invention practically coincide with the characteristics of a standard fuel assembly due to the presence of a system of two parallel channels formed by the seed and blanket subassemblies and joined by common distribution (delivery) and collection headers. The seed and blanket subassemblies are hydraulically connected in the inlet and outlet segments. This fuel assembly structure ensures maintaining the resistance of the core of a VVER-1000 reactor with fuel assemblies according to one or more embodiments of the invention at the nominal level. Hence installing fuel assemblies according to one or more embodiments of this invention in a VVER-1000 reactor will not cause a change in the coolant flow rate in the primary loop of the reactor. The ratio of hydraulic resistances between the inlet to the assembly, the active part of the blanket subassembly and the outlet from the assembly in fuel assemblies according to one or more embodiments of this invention and the standard fuel assembly are similar, which ensures hydraulic compatibility of fuel assemblies according to one or more embodiments of the invention with standard assemblies and the absence of coolant overflows between them. This makes it possible to use some fuel assemblies according to one or more embodiments of this invention in a reactor at the same time with standard fuel assemblies for the reactor.

Neutronic compatibility with the standard fuel assembly is provided by the following:
 the specified burn-up level is achieved by utilizing specific fuel compositions and compositions with burnable absorbers;
 standard power output of the fuel assembly is achieved by utilizing specific fractions of fuel loading in seed and blanket fuel compositions;
 satisfaction of requirements for an uneven profile of power output is achieved by utilizing specific fractions of fuel loading in various rows of seed rods and the composition of fuel loading in the blanket;
 preservation of reactivity effects within the range typical for standard fuel assemblies is achieved by utilizing special characteristics of fuel compositions;
 the ability to regulate the level of output and reduce the output using standard control systems is achieved by utilizing standard technological channels for guiding control rods in the peripheral tubes in the seed subassembly which are compatible with the subassembly.

Another advantage of one or more embodiments of the invention is that the seed-blanket fuel assembly according to one or more embodiments of this invention is sectional, which makes it possible to change the seed subassembly independently. Changing the seed subassembly more frequently produces more favorable conditions (with respect to neutron balance and irradiation time) for the thorium placed in the blanket subassembly of the fuel assembly.

The foregoing illustrated embodiments are provided to illustrate the structural and functional principles of various embodiments of the present invention and are not intended to be limiting. To the contrary, the principles of the present invention are intended to encompass any and all changes, alterations and/or substitutions within the spirit and scope of the following claims. Any one or more aspects of the various embodiments may be used without also using other aspects of such embodiments, and without deviating from the scope of the present invention. For example, while the illustrated fuel elements 10 have a spiral twist along their longitudinal axes, such spiral may be omitted. While the illustrated fuel elements 10 have a non-cylindrical cross-section, they may alternatively comprise a cylindrical cross-section. While the illustrated fuel elements 10 include a plurality of spacer ribs or lobes 16, such ribs/lobes 16 may be omitted. While the illustrated fuel elements 10 include displacers 17, such displacers may be omitted. While the illustrated fuel elements 10 are used in conjunction with a seed/blanket arrangement within a fuel assembly, the fuel elements 10 may alternatively be used in conjunction with a variety of other types of fuel assemblies and/or core designs. While the illustrated fuel assembly 2 utilizes a channel 12 and various other particular structures within a fuel assembly, such structures may be omitted and/or modified in a variety of ways to accommodate other assembly and/or core designs.

What is claimed is:

1. A fuel assembly for use in a nuclear reactor, the fuel assembly comprising:
   a seed subassembly comprising a seed frame and a plurality of seed fuel elements supported by the seed frame;
   a blanket subassembly comprising a blanket frame and a plurality of blanket fuel elements supported by the blanket frame; and
   a locking mechanism selectively movable between and locked positions to releasably lock the seed and blanket frames together,
   wherein the seed subassembly is detachable from the blanket frame when the locking mechanism is in a released position,
   wherein the locking mechanism locks the seed and blanket frames together when in the locked position, and
   wherein the locking mechanism is in the locked position and the fuel assembly is not disposed inside of a nuclear reactor.

2. The fuel assembly of claim 1, wherein the blanket subassembly laterally surrounds the seed subassembly.

3. The fuel assembly of claim 2, wherein the blanket subassembly comprises a central opening into which the seed subassembly fits.

4. The fuel assembly of claim 1, wherein the plurality of seed fuel elements comprise fissionable material, and wherein the plurality of blanket fuel elements comprise thorium.

5. The fuel assembly of claim 1, wherein the locking mechanism comprises:
   at least one ball that is movable between first and second positions, wherein the first position is a position in which the at least one ball permits the seed and blanket frames to detach from each other, and wherein the second position is a position in which the at least one ball physically prevents the seed and blanket frames from detaching from each other; and
   a locking element that is movable between locking and releasing positions,
   wherein the locking position is a position the locks the at least one ball in the second position, which locks the seed and blanket frames together and defines the locked position of the locking mechanism, and
   wherein the releasing position is a position that permits the at least open ball to move into the first position, which permits the seed and blanket frames to detach from each other and defines the released position of the locking mechanism.

6. The fuel assembly of claim 1, wherein the fuel assembly in constructed and arranged to be moved from outside the nuclear reactor to inside the nuclear reactor while the locking mechanism remains in its locked position.

7. The fuel assembly of claim 1, wherein the fuel assembly is constructed and arranged to be moved from inside the nuclear reactor to outside the nuclear reactor while the locking mechanism remains in its locked position.

8. The fuel assembly of claim 1, wherein:
   the blanket subassembly further comprises a tailpiece; and
   the locking mechanism when in the locked position secures the seed subassembly to the tailpiece of the blanket subassembly.

9. A fuel assembly for use in a nuclear reactor, the fuel assembly comprising:
   a seed subassembly comprising a seed frame and a plurality of seed fuel elements supported by the seed frame;
   a blanket subassembly comprising a blanket frame and a plurality of blanket fuel elements supported by the blanket frame; and
   a locking mechanism selectively movable between released and locked positions to releasably lock the seed and blanket frames together,
   wherein the seed subassembly is detachable from the blanket frame when the locking mechanism is in a released position,
   wherein the locking mechanism locks the seed and blanket frames together when in the locked position, and
   wherein the locking mechanism is constructed and arranged to be movable between the locked and released position while the fuel assembly is not disposed inside of a nuclear reactor.

10. The fuel assembly of claim 9, wherein the fuel assembly is constructed and arranged to be movable into and out of a nuclear reactor while the locking mechanism remains in the locked position.

* * * * *

UNITED STATES PATENT AND TRADEMARK OFFICE
CERTIFICATE OF CORRECTION

| | | |
|---|---|---|
| PATENT NO. | : 8,116,423 B2 | Page 1 of 1 |
| APPLICATION NO. | : 12/340833 | |
| DATED | : February 14, 2012 | |
| INVENTOR(S) | : Bashkirtsev et al. | |

It is certified that error appears in the above-identified patent and that said Letters Patent is hereby corrected as shown below:

On the Title Page, Item (30) should be inserted:

--(30)   Foreign Application Priority Data

December 26, 2007   (PCT)         PCT/RU2007/000732--

Signed and Sealed this
Seventeenth Day of June, 2014

Michelle K. Lee
*Deputy Director of the United States Patent and Trademark Office*